United States Patent [19]

Spellman et al.

[11] Patent Number: 5,252,878
[45] Date of Patent: Oct. 12, 1993

[54] BRUSH HOLDER ASSEMBLY

[75] Inventors: James A. Spellman, Noblesville; Jeffrey L. Mummert, Anderson; Frank D. Sorg, Middletown, all of Ind.

[73] Assignee: General Motors Corporation, Detroit, Mich.

[21] Appl. No.: 991,886

[22] Filed: Dec. 17, 1992

[51] Int. Cl.⁵ .................................. H02K 13/00
[52] U.S. Cl. ...................... 310/239; 310/42; 310/71
[58] Field of Search .......... 310/42, 71, 89, 219, 310/239, 242, 245, 247, 249

[56] References Cited

U.S. PATENT DOCUMENTS

| | | | |
|---|---|---|---|
| 1,375,658 | 4/1921 | Gilchrist | 310/239 |
| 1,763,549 | 6/1930 | Apple | 310/239 |
| 3,510,709 | 5/1970 | Walker et al. | 310/239 |
| 4,266,155 | 5/1981 | Niemela | 310/239 |
| 4,475,053 | 10/1984 | Mayer | 310/239 |
| 4,538,085 | 8/1985 | Tanaka | 310/239 |
| 4,590,398 | 5/1986 | Nagamatsu | 310/239 |
| 4,754,184 | 6/1988 | Morikane et al. | 310/239 |
| 4,891,539 | 1/1990 | Okamoto et al. | 310/239 |
| 5,148,072 | 9/1992 | Shiroyama | 310/239 |

OTHER PUBLICATIONS

General Motors Brush Holder Assembly, 1 sheet drawing, around 1987.

*Primary Examiner*—Steven L. Stephan
*Assistant Examiner*—D. R. Haszko
*Attorney, Agent, or Firm*—Creighton R. Meland

[57] ABSTRACT

A brush holder assembly for a dynamoelectric machine. The assembly comprises an annular metallic support plate that carries a plurality of metallic brush holders. Each brush holder slidably supports a brush. Two of the brush holders have tangs that extend from a respective brush holder. A bus bar formed of copper is welded to the tangs to thereby support the bus bar from the brush holders. The brushes that are associated with the two brush holders are each connected to a brush conductor. The brush conductors are welded to the bus bar. Another conductor or lead is welded to the bus bar to feed current to the bus bar.

3 Claims, 1 Drawing Sheet

BRUSH HOLDER ASSEMBLY

This invention relates to a brush holder assembly for a dynamoelectric machine.

In certain types of dynamoelectric machines, for example, the direct current motor of an electric engine starter, the brush holder assembly is arranged such that when the motor is energized, a pair of opposed brushes are electrically connected to the positive side of the battery on a motor vehicle. In one known brush holder assembly, a metallic bus bar or connector is electrically connected to the opposed brushes. The connector is supported by riveting the connector to arm portions of metallic brush holders. In the arrangement that has been described, the connector or bus bar is located in a plane that is normal to the longitudinal axis of the brush holder assembly.

The brush holder assembly of this invention utilizes a bus bar or connector but the connector is welded directly to tangs that are integral with two metallic brush holders. By welding the connector to the brush holders, the need for rivets is eliminated. Further, since rivets are not used, there are no rivet holes in the connector. The use of rivet holes in a connector tends to reduce the cross-sectional area of the connector so that if a connector has rivet holes, the overall cross-sectional area of the connector must be made large enough to accommodate for the loss of connector material due to the rivet holes. Since no rivet holes are used with the connector of this invention, the cross-sectional area of the connector can be reduced.

IN THE DRAWINGS

Figure 1:
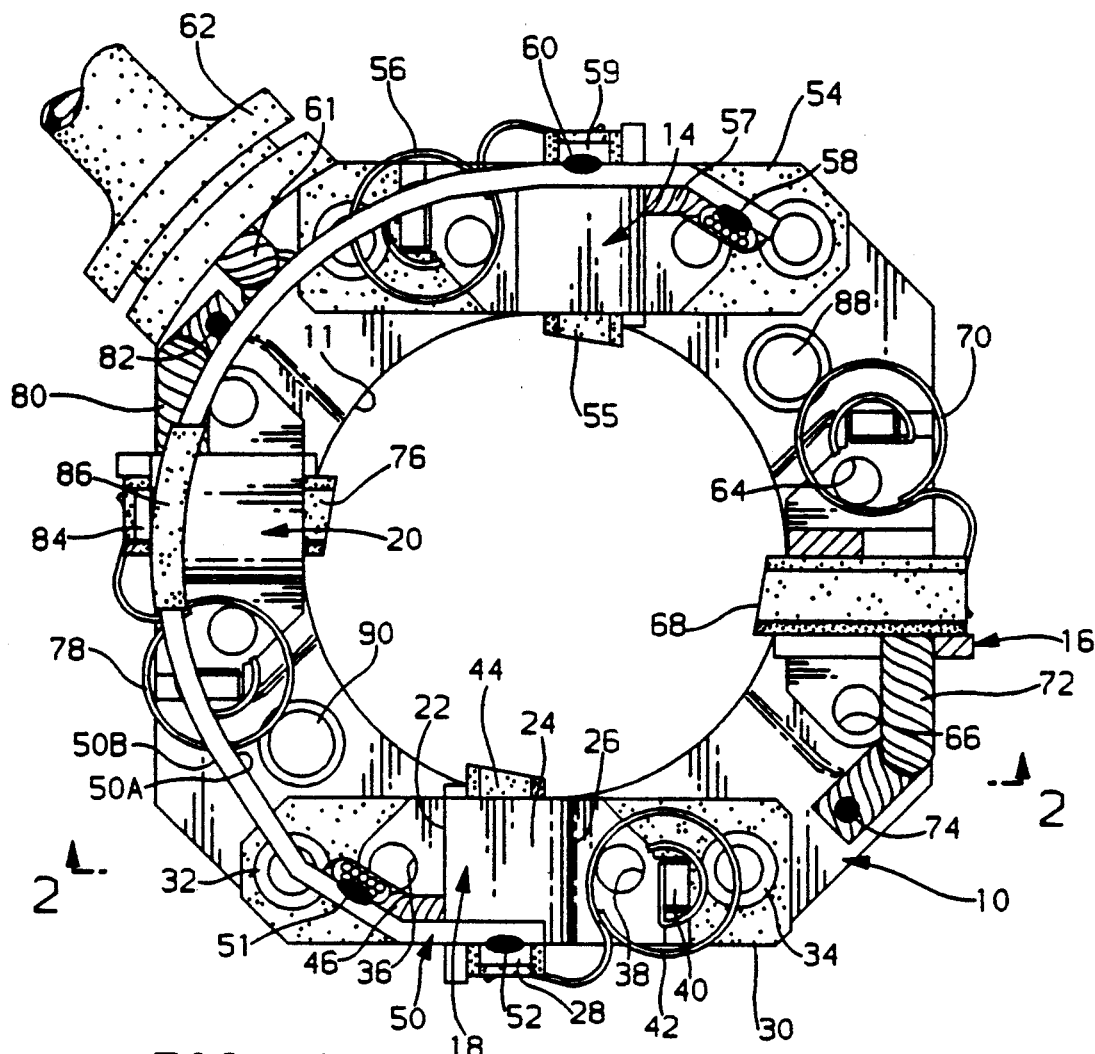
FIG. 1 is a plan view of a brush holder assembly made in accordance with this invention.

Referring now to the drawings, the brush holder assembly comprises a generally annular metallic support plate 10 that has a central opening 11. The plate 10 supports four metallic brush holders that are respectively generally designated as 14, 16, 18 and 20. These brush holders are identical and they are formed of brass.

The brush holder 18 has a U-shaped portion comprised of walls 22, 24 and 26. The wall 24 has an integral tang 28 that extends from wall 24. The tang 28 lies in a plane that is normal to plate 10 and is parallel to the longitudinal axis of the brush holder assembly.

An insulator 30 that is formed of an electrical insulating material is disposed between brush holder 18 and plate 10 to electrically insulate brush holder 18 from plate 10. The plate 10 has tubular portions 32 and 34 that extend through openings formed in insulator 30. These tubular portions 32 and 34 are staked or spun over to thereby secure insulator 30 to plate 10.

The brush holder 18 has integral tubular portions 36 and 38 that extend through openings formed in insulator 30. These tubular portions 36 and 38 are staked or spun over to secure brush holder 18 to insulator 30.

The brush holder 18 has an arm portion 40 that supports a brush spring 42. The brush spring 42 has a portion that engages a portion of a carbon brush 44 and urges the brush 44 radially inwardly toward the central opening 11.

The brush 44 is electrically connected to a brush shunt conductor 46 which passes through a slot 48 in wall 22 of brush holder 18. The end of conductor 46 is welded to a metallic bus bar or connector 50 at weld area 51 and accordingly, the brush 44 is electrically connected to connector 50. The connector 50 is also welded to tang 28 of brush holder 18 at a weld area 52 to form a mechanical support for one end of connector 50. Conductor 46 is welded to a portion of the inside surface 50A of connector 50 and tang 28 is welded to a portion of the outside surface 50B of connector 50. The surfaces 50A and 50B are normal to the plate 10 and extend generally parallel to the longitudinal axis of the brush holder assembly.

The bus bar or connector 50 has a rectangular cross-section and is formed of tin plated copper. By way of example, and not by way of limitation, the connector 50 may be about 4 mm. wide and about 1.60 mm. thick.

Figure 2:
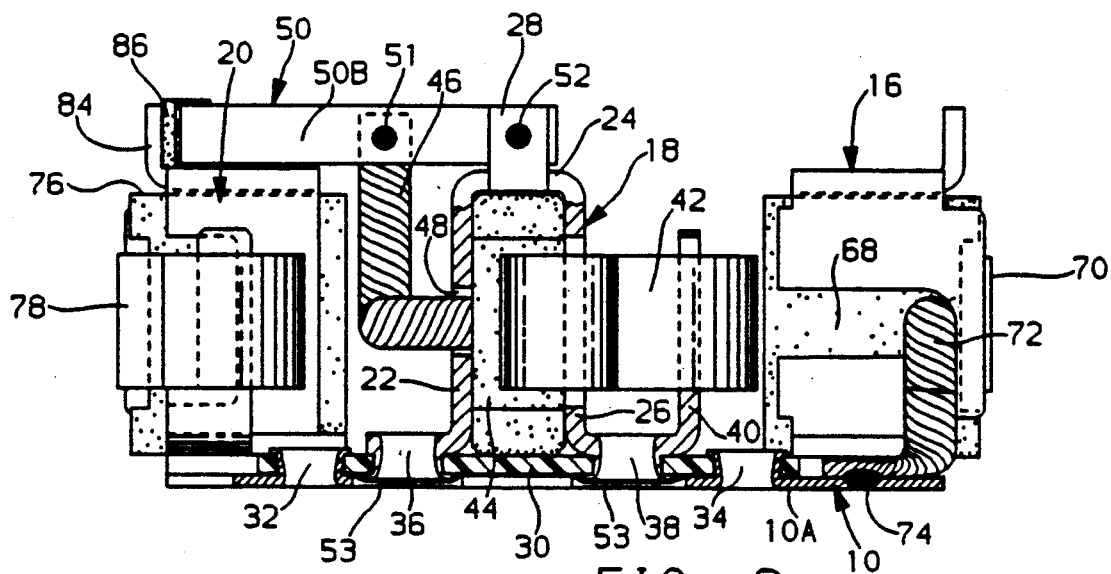
FIG. 2 is a sectional view with parts left in elevation taken generally along line 2—2 of FIG. 1.

The brush holder assembly has a thin insulator 53 formed of electrical insulating material that is shown in FIG. 2. The insulator 53 covers the lower ends of tubular portions 36 and 38 to prevent carbon brush dust that might enter the tubular parts from engaging plate 10. If no insulator were provided, the carbon dust could collect and eventually form a conductive path between brush holder 18 and metal plate 10. The insulator 53 is fixed in place by tubular portions 32 and 34 of plate 10.

The brush holder 14, as previously described, is identical to brush holder 18 and accordingly is not described in detail. Brush holder 14 is secured to an insulator 54 and insulator 54 is secured to plate 10. A carbon brush 55 is slidably supported by brush holder 14 and is urged radially inwardly by brush spring 56. Brush 55 is connected to a brush shunt connector or lead wire 57, the end of which is welded to a portion of the inside surface 50A of connector 50 over a weld area 58.

The brush holder 14 has a tang 59 that is identical to tang 28 of brush holder 18. A portion of the inside surface of tang 59 is welded to a portion of the outside surface 50B of connector 50 over a weld area 60. An insulator (not illustrated) identical to insulator 53 is provided for covering tubular portions of brush holder 14.

The bus bar or connector 50 is welded to a conductor or lead wire 61. Lead wire 61 has a portion (not illustrated) which extends through a rubber grommet 62.

The conductor 61 is connected to a positive voltage and when the brush holder assembly is assembled to an electric engine starter conductor 61 is connected to the motor terminal of a starter solenoid.

When the brush holder assembly of this invention is used in a cranking motor, conductor 61 has positive battery voltage applied thereto when the switch of the starter solenoid closes. The conductor 61 supplies current to bus bar or connector 50 which, in turn, forms current paths for current that is supplied respectively to brushes 44 and 55 through respective brush leads 46 and 57.

The bus bar or connector 50 is electrically connected to metallic brush holders 14 and 18. However, the primary purpose of welding connector 50 to the tangs of the brush holders is to provide a rigid mechanical connection between the connector 50 and the brush holders. Thus, connector 50 is mechanically supported by brush holders 14 and 18. The primary current path between connector 50 and the brushes is through the brush leads 46 and 57.

The brush holder 16 is mounted directly on a portion of metal support plate 10 by means of staked over tubular portions 64 and 66 that are the same as tubular portions 38 and 36 of brush holder 18. There is no insulator between brush holder 16 and plate 10 and accordingly, there is metal-to-metal contact between these parts.

Brush holder 16 slidably supports a carbon brush 68 that is urged radially inwardly by brush spring 70. Brush 68 is connected to a conductor or brush lead 72. The end of brush lead 72 is welded to metal plate 10 at weld area 74.

Brush holder 20 is secured directly to metal plate 10 in the same manner that brush holder 16 is secured to metal plate 10. There is no insulator between brush holder 20 and plate 10 and accordingly, there is metal-to-metal contact between these parts.

Brush holder 20 slidably supports a carbon brush 76 which is urged radially inwardly by a brush spring 78. Brush 76 is connected to a conductor or brush lead 80. The end of lead 80 is welded to plate 10 at weld area 82.

The brush holder 20 has a tang 84 which is the same as tangs 28 and 59. A short length of the connector 50 has electrical insulating tape wound around it to form a taped portion 86. This taped portion 86 serves to electrically insulate the connector 50 from tang 84 and from brush holder 20. A part of the taped portion 86 engages the tang 84.

In the use of the brush holder assembly of this invention in a cranking motor application, the brushes 68 and 70 are so-called negative brushes since they are connected to a negative voltage. Thus, the negative post of a battery on a motor vehicle is connected to ground and in use, the metal plate 10 is also grounded. In this regard, the brush holder assembly is adapted to be secured to a metal cup-shaped commutator end plate or end housing of a cranking motor. The end surface 10A of plate 10 directly contacts an inner surface of the end wall of the cup-shaped housing. The brush holder assembly has two holes 88 and 90 formed in plate 10. The surfaces defining these holes engage threaded portions of fasteners that are used to secure the brush holder assembly to the cup shaped housing.

As will be apparent to those skilled in the art, the brushes of the brush holder assembly are adapted to engage the commutator of an armature of a direct current motor.

The embodiments of the invention in which an exclusive property or privilege is claimed are defined as follows:

1. A brush holder assembly for a dynamoelectric machine comprising, a support plate defining a central opening, a first brush holder formed of metallic material carried by said support plate having an end portion that is spaced from said support plate, said first brush holder having a first integral tang that extends axially from said end portion of said first brush holder, said first tang being located normal to said support plate, a first brush slidably supported by said first brush holder for radial inward movement, a second brush holder formed of metallic material carried by said support plate having an end portion that is spaced from said support plate, said second brush holder having a second integral tang that extends axially from said end portion of said second brush holder, said second tang located normal to said support plate, said second brush holder being circumferentially spaced from said first brush holder, a second brush slidably supported by said second brush holder for radial inward movement, a bus bar formed of electrically conductive metallic material extending between said first tang and said second tang, said bus bar having a predetermined width and a predetermined thickness, said width being larger than said thickness, said bus bar being positioned such that its width extends substantially normal to said support plate, said first tang being welded to said bus bar at first weld area, said second tang being welded to said bus bar at a second weld area, a first conductor connected to said first brush, said first conductor being welded to said bus bar, a second conductor being welded to said bus bar and a third conductor welded to said bus bar for feeding current to said bus bar.

2. The brush holder assembly according to claim 1 where said support plate is formed of metal, where said first brush holder is secured to a first electrical insulator that is secured to said support plate and where said second brush holder is secured to a second electrical insulator that is secured to said support plate.

3. The brush holder assembly according to claim 1 where said bus bar has an inner surface and an outer surface, said first and second tangs being welded to portions of said outer surface of said bus bar, said first and second conductors being welded to portions of said inner surface of said bus bar.

* * * * *